Figure 1:
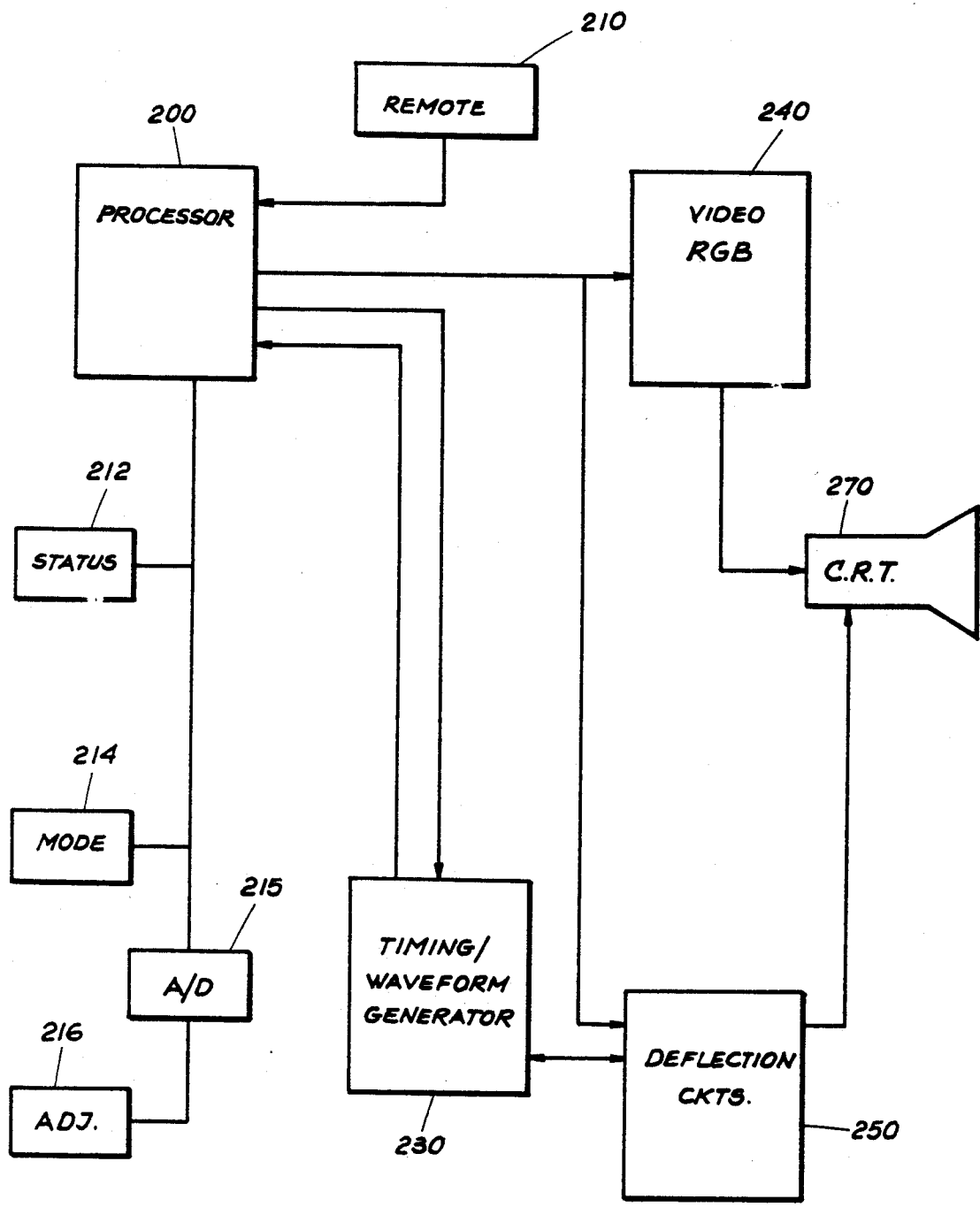

United States Patent [19]

Wilkes et al.

[11] Patent Number: 5,241,281
[45] Date of Patent: Aug. 31, 1993

[54] MICROPROCESSOR CONTROLLED MONITOR

[75] Inventors: Derek Wilkes, Powell; Robert Shaufl, Pickerington; James Warchol, Columbus, all of Ohio

[73] Assignee: Capetronic Group Ltd., Kowloon, Hong Kong

[21] Appl. No.: 495,857

[22] Filed: Mar. 19, 1990

[51] Int. Cl.$^5$ ............................................. G09G 1/02
[52] U.S. Cl. ................................... 340/799; 340/814; 358/180
[58] Field of Search ............... 358/148, 150, 158, 139, 358/140, 180, 22, 10; 340/814, 799, 717, 731, 720, 771

[56] References Cited

U.S. PATENT DOCUMENTS

| | | | |
|---|---|---|---|
| 2,802,140 | 6/1953 | Mattingly | 358/180 |
| 4,079,413 | 3/1978 | Yamashita | 358/180 |
| 4,282,546 | 8/1981 | Reitmeier | 358/22 |
| 4,779,132 | 10/1988 | McBeath | 340/814 |
| 4,816,908 | 3/1989 | Colineau et al. | 358/10 |
| 4,990,904 | 2/1991 | Zenda | 340/771 |

OTHER PUBLICATIONS

Scott Mueller, Upgrading and Repairing PCs, 1988, pp. 442-443.
Donald G. Fink, Television Engineering Handbook, 1957, 6-58 to 6-62.
T. D. Towers, Transistor Television Receivers, 1963, 116-135.

Primary Examiner—Ulysses Weldon
Assistant Examiner—Matthew Luu
Attorney, Agent, or Firm—Hopgood, Calimafde, Kalil, Blaustein & Judlowe

[57] ABSTRACT

A display monitor capable of providing fully synchronized image display in response to an incoming video signal having a range of possible timing formats. The monitor employs a microprocessor that discriminates between the disparate horizontal and vertical sync signals by developing a characteristic signature of the timing format and thereafter searching a resident database of different formats to discern a match. A calibration mode is provided to allow the adjustment of the monitor to an incoming signal that is otherwise unrecognized by the microprocessor or to allow the updating of previously stored information.

11 Claims, 5 Drawing Sheets

MICROPROCESSOR CONTROLLED MONITOR

The present invention generally relates to video display monitors. More particularly, the present invention relates to a microprocessor controlled video display monitor that automatically adjusts to incoming video transmissions having differing video formats and image resolution.

BACKGROUND OF THE INVENTION

The application of video display monitors in such diverse areas as finance, design, graphic arts and manufacturing has undergone an explosive surge in growth. This growth corresponds to the depth that personal computers and other microprocessor controlled devices have penetrated business and personal use. The requirements of monitors addressing the myriad of diverse applications in today's market extend well beyond the capabilities of the television receivers designed for commercial broadcast reception. These monitor applications individually engender a subset of system requirements specific to each application, and further, individual applications often represent small niches in an otherwise large monitor market. Taken together, these two attributes have forced a degree of monitor customization by manufacturers with the attendant high cost and price associated with custom manufacturing operations.

An example of this problem resides in the market for engineering work stations. These specialized computer systems often mandate a level of monitor performance beyond commercially established standards. A computer aided design/computer aided manufacturing (CAD/CAM) work station directed to semi-conductor circuit design will invariably require a high resolution display monitor for the presentation of closely arrayed thin circuit lines to the user or designer. The high resolution display is required to accurately present the line information while minimizing the staircase effect associated with the horizontal scanning process.

Other work station applications will focus on different display attributes, such as color richness. The available color palette is of critical importance to the graphic designer developing color graphics for, e.g., the product packaging industry. Again, the capability to provide rich color images resides in the specific control circuitry of the display monitor.

Display monitors have also found extended use in applications requiring real time monitoring of multiple incoming video signals wherein these incoming signals may represent various and differing video format standards. An example of this application is found in the command and control operations for military installations. A single monitor must quickly shift between disparate incoming video signals to provide the observer a real time, accurate display. These incoming signals will include local broadcasts using the NTSC broadcast format, and foreign broadcasts in PAL, SECAM, or other video format corresponding to the locale of the broadcast.

A common thread seen in these applications is the need to provide a high resolution monitor capable of some customization to the requirements of specific end users while simultaneously addressing specific industry video standards, such as EGA, VGA, etc. and broadcast standards, i.e., NTSC, PAL and SECAM. These established formats vary from each other in the timing signals associated with the delivery of the video and audio information. Image timing refers to the horizontal scanning rate and vertical frame rate associated with the raster scan across the display screen. These rate values are the synchronization signals that control the placement of picture information in the image.

Monitor performance is a function of the timing of the video format, in terms of horizontal and vertical synchronization. Indeed, the image resolution is directly proportional to the horizontal line scanning frequency, which will vary depending on the video format (e.g., 15.750 kHz for NTSC broadcast format). Display monitors are normally considered high resolution if the horizontal scanning rate exceeds twice the NTSC standard, or about 31.5 kHz, although resolution can also be increased by lowering the vertical frame rate, e.g., from 60 Hz to 43 Hz. Lowering the vertical frame rate is limited by the appearance of a user detectable flicker on the monitor screen at the lower frame frequencies.

Prior efforts to provide multiple timing capabilities in display monitors has for the most part been extremely limited. For example, in U.S. Pat. No. 4,679,091 (to Kikuchi et al., the contents of which are herein incorporated by reference as if restated in full), the monitor switches the duty cycle of the horizontal oscillator in response to certain higher frequency scan rates. This system on the other hand is limited to scan rates about double of the NTSC video format. A similarly restricted system is provided in U.S. Pat. No. 4,684,987 (to Tsutsui, the contents of which are herein incorporated by reference as if restated in full).

The requirements of many of the important monitor applications involve horizontal line scanning rates that can extend up to 75 kHz, and different so-called standards are appearing with timing formats in between the NTSC format and these higher values. The industry has, therefore, long sought a display monitor capable of displaying a range of video formats while simultaneously providing the user the ability to customize the display monitor to specific non-standard video formats.

It was with this understanding of the needs of the display monitor marketplace that the present invention was developed.

OBJECTS AND SUMMARY OF THE PRESENT INVENTION

It is an object of the present invention to provide a microprocessor controlled monitor capable of receiving and displaying multiple video formats having differing levels of line and color resolution.

It is another object of the present invention to provide a microprocessor controlled monitor that detects the signature of an incoming video format and automatically adjusts the horizontal line and vertical frame format to correspond to the incoming signal.

It is yet another object of the present invention to provide a microprocessor controlled monitor that detects an incoming video signal, counts the incoming horizontal and vertical sync pulses, selects a corresponding timing format from a look-up table, and outputs a digital control signal corresponding to the selected horizontal and vertical sync signal.

It is a further object of the present invention to provide a microprocessor controlled monitor that detects the signature of an incoming video signal, compares this signal with video format values associated with that signature stored in a look-up table in non-volatile memory, and controls the display with an output corresponding to the matching stored video format.

It is yet another object of the present invention to provide a display monitor with a calibration mode wherein coarse alignment timing format parameters are supplied from memory to the deflection circuits sufficient to generate a stable image on the monitor. The user then adjusts the size and position of a image relative to the monitor. The parameters associated with the properly sized image are then stored in non-volatile memory for subsequent automatic recall during future monitor operation.

The above and other objects of the present invention are realized in a specific illustrative video display monitor that separates and detects video format information from an incoming video signal and compares this video signature with stored signatures of various standard and custom video timing formats to determine if a match exists. If a match is perceived, the system accesses the video format information associated with the stored signature and outputs this video format information to the display control circuits thereby synchronizing the display monitor to the incoming video signal. In this way, a single monitor is capable of receiving and displaying a multitude of incoming video signal formats.

In accordance with the varying aspects of the present invention, the inventive microprocessor controlled monitor provides an operational mode and a calibration mode. The operational mode permits multi-format reception and display as will be more fully explained below. The calibration mode permits the user to adjust the monitor display in conjunction with a unique incoming signal format, and to store the timing constants associated with the proper display of the video signal with the unique signal format. This user calibration mode provides for custom adjustments by the user to ensure proper monitor performance even when presented with a non-standard video signal.

Figure 2:
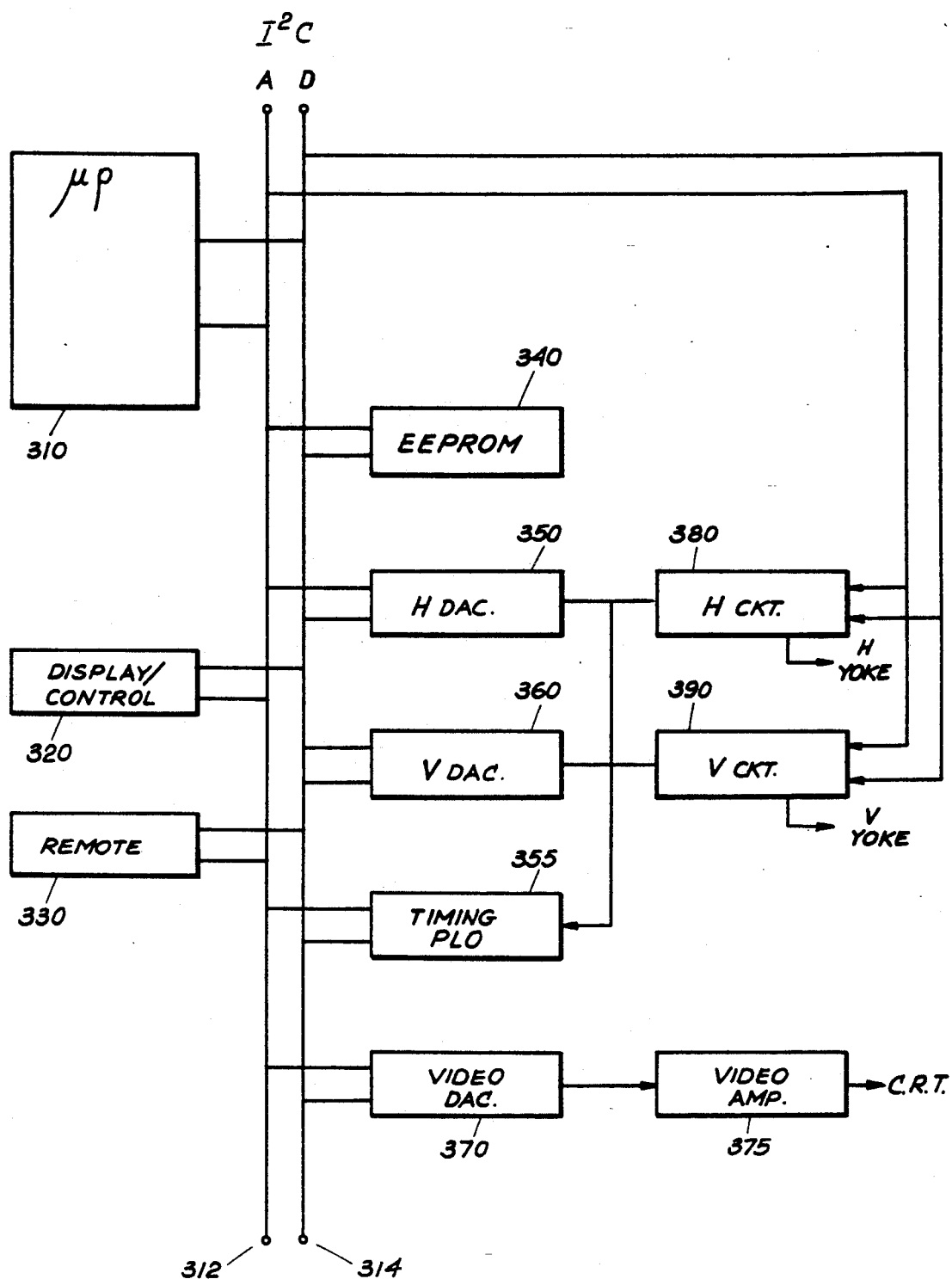
Figure 3:
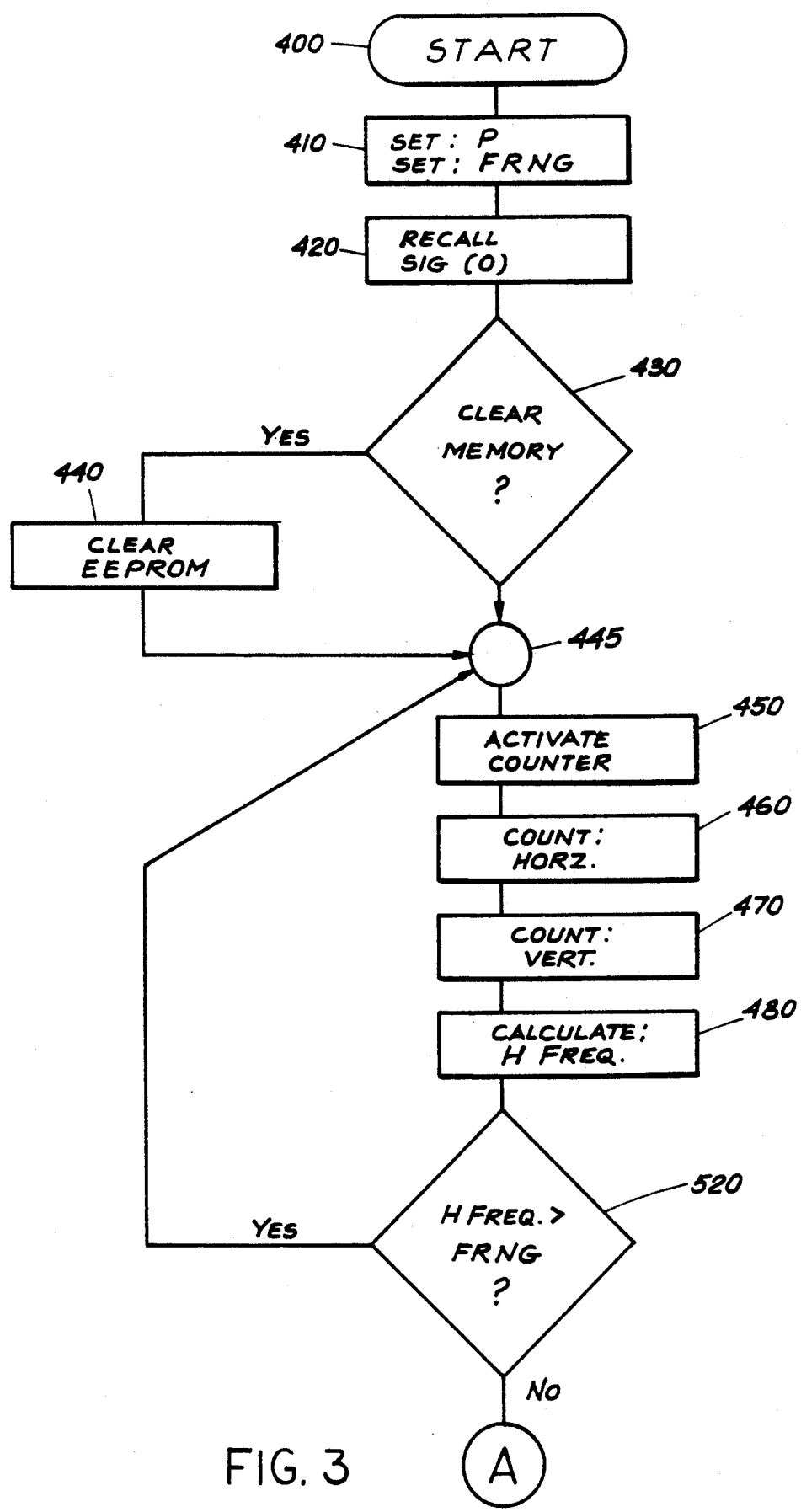
Figure 4:
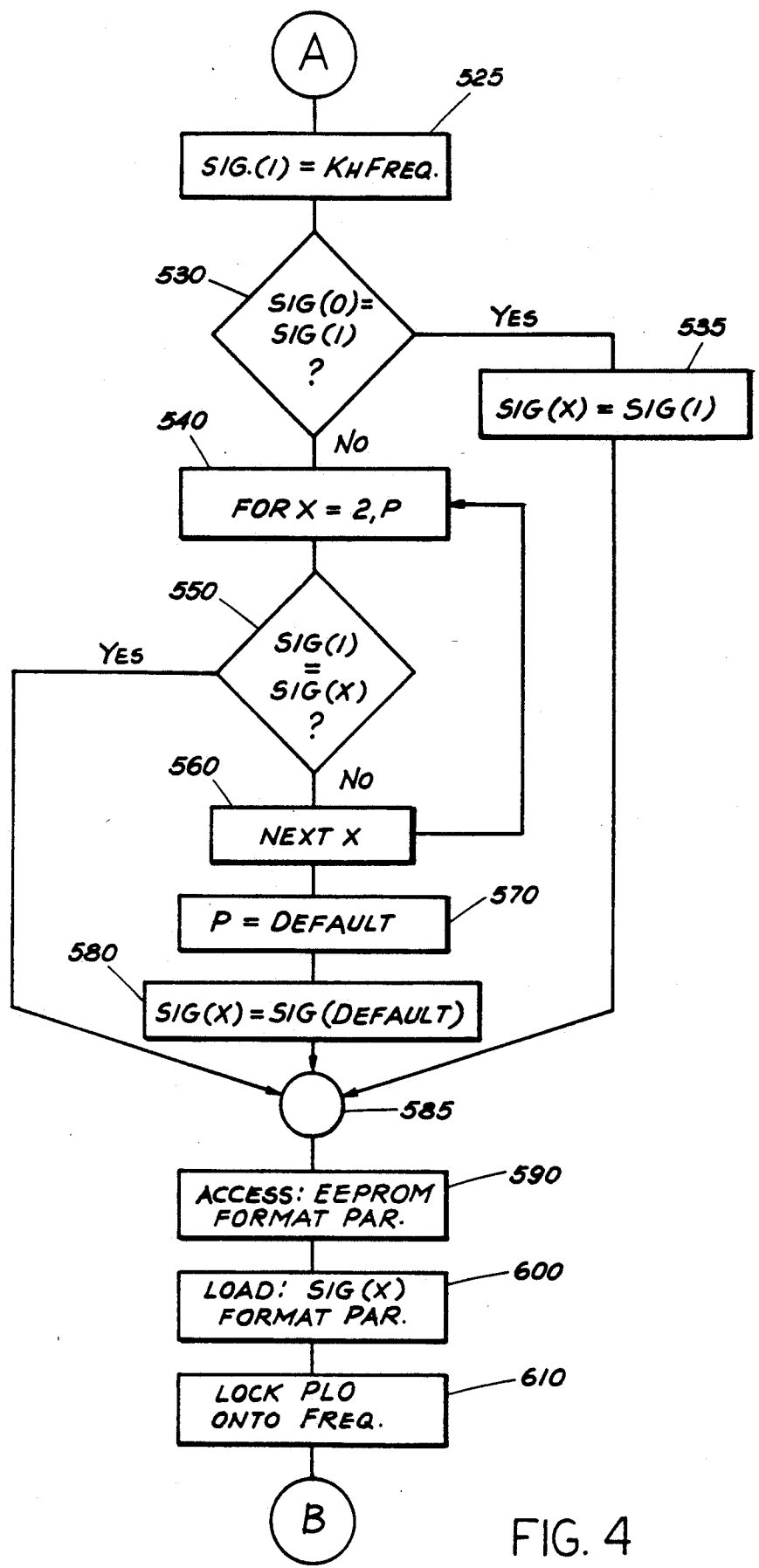
Figure 5:
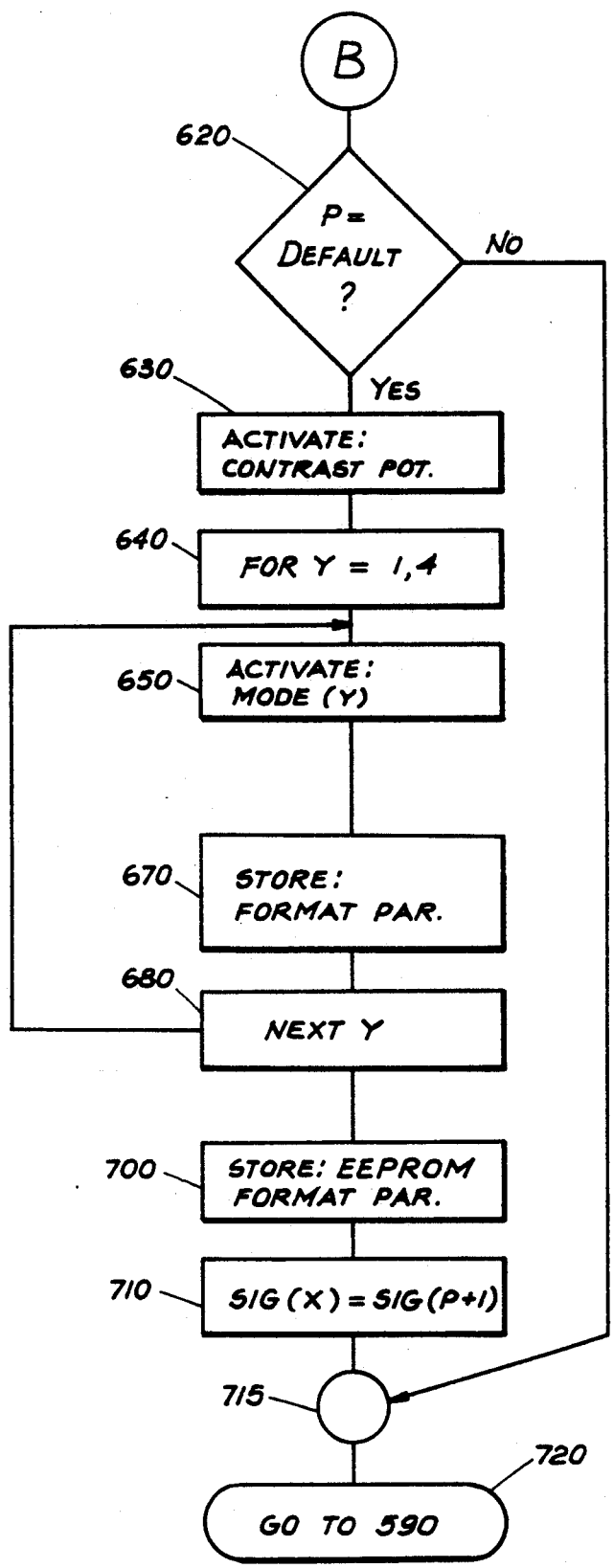

The foregoing features of the present invention may be more fully appreciated from the following detailed description of a specific illustrative embodiment thereof, presented hereinbelow in conjunction with the accompanying drawings, in which:

FIG. 1 presents a block diagram of the microprocessor controlled monitor;

FIG. 2 presents a block diagram of the processor and affiliated subsystems in the microprocessor controlled monitor; and FIGS. 3, 4 and 5 provide a flowchart of the program logic governing the microprocessor.

DESCRIPTION OF THE PRESENT INVENTION

Discussing the present invention first briefly in overview, the microprocessor controlled monitor employs a digital microprocessor to inter alia, control the horizontal and vertical deflection boards in response to the incoming video signal format. The incoming video timing signal is digitized and then directed to a counter circuit in the microprocessor that determines a horizontal and vertical signal frequency and a characteristic timing format signature based thereon. The microprocessor uses this signature as an address label in accessing a look-up table.

The look-up table is stored in non-volatile random access memory (NVRAM), and preferably stored in an electronically erasable programmable read only memory device (EEPROM). The look-up table consists of address locations designated by the discrete timing signatures. Each timing signature acts as a label for the contents of the respective memory location, as the associated memory location stores the timing constants characterizing that video format. The stored timing signatures and constants will comprise both industry established video format standards and user determined formats.

The microprocessor reads the stored timing constants and pursuant to these values, controls the horizontal and vertical sync rates of the monitor. More particularly, the microprocessor loads the registered inputs to a pair of digital to analog converters (DACs) with the numeric value equivalent to the resistive value required by the video format being presented to the monitor for display. In this way, both the horizontal and vertical timing signals are channeled through dedicated DAC's to control the respective horizontal and vertical deflection circuits. These DACs replace the adjustment potentiometers found in conventional monitors and permit the discrimination between differing incoming video formats and automatic alignment of the monitor.

If the incoming video format finds no counterpart in the look-up table, the system selects default values for a coarse setting of the timing signals. This coarse setting provides a stable image on the monitor, but one that departs from a correct image in terms of spatial dimensions, i.e., the image width and height will not correspond to the monitor screen. The monitor is equipped with calibration adjustment switches that permit the user to modulate the default values and reconfigure the displayed image spatially to correspond to the screen dimensions. Once the image is properly aligned by the user pursuant to this adjustment cycle, these newly determined values are stored in monitor memory; the memory location is labeled with the signature of prior unrecognized video format so that it may be automatically recalled upon subsequent use of the monitor. It is this calibration cycle that permits the user to customize his monitor to his specific requirements.

Referring now to FIG. 1, the operative elements of the inventive display monitor are shown in block diagram format. In particular, a control processor 200 is linked to an incoming video signal train, via remote interface 210. The incoming signal comprises the video image and timing information including composite red, green and blue color signals defining the raster scan image, and horizontal and vertical sync. pulses. Alternatively, the video signal can be segregated into component parts, i.e., separate image and timing signals, prior to reception by the monitor. The processor 200 also is connected to status display 212 and mode switch 214. The status display indicates to the user the current configuration of the system viz., operative or calibration mode. The mode switch 214 permits the selection between modes, and adjustment control 216 provides the user the ability to adjust the displayed image pursuant to the calibration mode in a manner more fully described below. Adjustment control 216 will also control the video contrast, when not in calibration mode. The analog signal from control 216 is converted to digital information, via A/D converter 215, which will be processed by processor 200. This information will then be sent to the video amplifiers through a D/A converter, (see, block 370 and block 375 in FIG. 2) thereby controlling the contrast level of the video amplifier.

Processor 200 comprises a digital microprocessor, I$^2$C bus, digital EEPROM, and digital to analog converters (DACs). The structure and operation of processor 200 is discussed in more detail below, in reference to FIG. 2. Continuing with FIG. 1, processor 200 is in communication with waveform generator 230. In this regard, waveform generator 230 receives the horizontal and vertical sync pulses and horizontal frequency, and controls the timing format based thereon. The waveform generator 230 includes a per se well-known phase lock oscillator to generate the requisite timing waveform supplied to the deflection circuit 250 at the incoming timing frequency.

The video signal received by processor 200 is directed to video controller 240 in terms of Red, Green, Blue, (RGB) color signals, and gain; this image signal is thereafter applied to the CRT 270 in conjunction with the timing signal from waveform generator 230. The raster scan projection associated with this video (image) signal is controlled by the timing signals designating the horizontal scan rate and vertical frame rate. This timing information is provided, via timing waveform generator 230, to deflection circuit 250. Deflection circuit 250 is also provided with timing format values in terms of horizontal and vertical size and position. The deflection circuit in turn controls the raster scan of the incoming video signal provided by video processor 240 to CRT 270.

Referring now to FIG. 2, a block diagram provides a detailed description of the processor 200 discussed above. As can be seen, processor 200 comprises an imbedded microprocessor 310 in communication with other monitor components, via address and data busses (I$^2$C Bus) 312 and 314, respectively. Information is provided to the bus, via display/control interface 320 and remote 330. Specifically, semiconductor memory 340 is linked to the microprocessor and provides interactive memory registers for selective retention and storage of timing format parameters. Semiconductor memory 340 is preferably an EEPROM device (Electronically Erasable, Programmable Read Only Memory), and provides random access memory registers for storing discrete timing format parameters for (i) standard video formats and (ii) user defined video formats.

The digitized timing format parameters retrieved from memory 340 are first stored in temporary memory (RAM) within the microprocessor 310. In operation, the timing format parameters are selectively directed by the microprocessor 310 to digital to analog converter (DAC) 350 (horizontal scan output) and DAC 360 (vertical frame output). In this manner, the digitized timing signals are converted into their analog counterparts and thereafter implemented to control the deflection circuits 380 and 390 and the output of the horizontal and vertical yokes of the CRT. The outputs from the above-identified DAC circuits also are provided to the timing circuit 355 to insure coherent presentation of the image and timing signals to the CRT.

Microprocessor 310 is a program controlled dedicated microprocessor governed by pre-established firmware logic. The microprocessor is responsible for detecting a known video format in controlling the output of the DACs pursuant to established timing format constants. The microprocessor 310 is also responsible for providing a simplified methodology for setting timing constants for the heretofore unrecognized timing format to an incoming video signal. The program logic associated with the microprocessor operation is presented in the flowchart provided in FIGS. 3, 4 and 5. In the following presentation, BASIC commands have been used for explanatory purposes.

More particularly and referring to FIG. 3, logic proceeds from block 400 indicating system power and directs the reset of the current memory locations storing discrete timing format parameters, block 410, and the recall of the last timing format implemented by the monitor, block 420 which is designated SIG(O). Test 430 queries whether the user wishes to clear all or no memory locations in memory 340. If yes, block 440 indicates the clearance of these registers.

During the next phase of operation, the system develops a timing signature of the incoming video signal by detecting the associated video signal sync pulses. More particularly, an internal counter is activated, block 450, and keyed to horizontal and vertical sync pulses as indicated by blocks 460 and 470 respectively. A horizontal scan frequency is then determined, block 480. This frequency value, designated HFreq is then compared to the upper frequency limit, designated FRNG, for the monitor as presently configured, test 520. If the current incoming signal has a horizontal scan frequency above that provided by the monitor ("yes" to test 520), the system logic loops back to terminal 445, and the counter operation is restarted. This loop is broken by (i) the conformation of an incoming frequency, or (ii) the default alarm associated with this logic loop (not shown).

If the video signal horizontal scan frequency is below the specified frequency limit ("no" to test 520), logic proceeds to block 525 (of FIG. 4) which assigns a signature label to the incoming signal corresponding to some multiple of its frequency:

$$SIG(1) = K^*H\ Freq \tag{1}$$

This value is then used at test 530 to determine whether the timing format has changed since the last count. The use of horizontal scanning frequency as a signature provides an effective means to discriminate between incoming formats. It is rare for formats to have the same frequency but differing parameters such as front/back porch, sync pulse width, etc. Assuming that the incoming signal is the same format, ("yes" to test 530), logic branches to block 535, wherein the system equates the current signature value, SIG(X) to the last signature value implemented by the monitor. If no match is made at test 530, logic proceeds to the next phase of operation, wherein the system iteratively applies the signature for the incoming video signal to previously received formats stored in EEPROM memory.

The iterative, matching loop is initiated at block 540 designating the range of addressable memory locations (2 to P) to be searched. At test 550, the memory is searched to determine whether the incoming signature corresponds to a previously stored signature label associated with timing format values stored at that memory location. If there is a corresponding signature stored in memory ("yes" to test 550), the system branches to terminal 585, and the current SIG(X) value is retained as the address location for the proper timing format parameters.

Alternatively, if no match occurs, the system continues through the loop for each value of X up to the memory limit, P. If no match has been made at this point, the incoming signal is unrecognized and the monitor must be calibrated. To permit the calibration cycle, coarse timing format parameters are selected from memory. These default values, i.e., horizontal hold, linearity, the B+voltage, etc., are selected by the microprocessor based on specific ranges of operation, viz., the frequency of the incoming timing format of the video signal. These default values provide a stable image to the CRT although the image will not necessarily be centered or of the right dimensions. At block 570, the default address is accessed and the signature thereto is assigned, block 580.

As presented in blocks 590, the established SIG(X) address label is used to access the associated timing format parameters, which are loaded into active (temporary) memory (RAM) at block 600. These values are then implemented in conjunction with the properly tuned PLO, block 610, to control the timing signal to the CRT via the respective DACs as discussed above. If the matching parameters are applied, the image on the monitor will be fully conforming to the incoming video signal and no further action is required. If, on the other hand, no match was realized, the user must calibrate the monitor to the unrecognized incoming video signal. The calibration cycle is also provided for factory alignment of the monitor of servicing. The calibration cycle is discussed below in conjunction with FIG. 5.

The system determines whether to calibrate pursuant to an affirmative response to test 620, i.e., current P=default. If so, at block 630, the microprocessor activates the contrast potentiometer as the calibration adjustment dial, and the iterative calibration loop is initiated at block 640. In this process, four separate parameters are routinely calibrated and therefore the loop is divided into four passes.

More particularly, the calibration cycle begins with mode(1) which permits the adjustment of the horizontal size/width of the displayed image; the user rotates the contrast potentiometer until the horizontal dimensions are correct. This data is then stored in temporary memory register, block 670. This is then repeated, via block 680, for horizontal position, mode(2); vertical size/height, mode(3); and vertical position, mode(4).

Additional calibration modes are provided for factory and/or service adjustment of pincushion correction, trapezoid correction, and horizontal linearity. On completion of the calibration cycle, the newly determined timing parameters are stored in the selected memory location, block 700, and provided with the new signature SIG(P+1), assuming the existence of unfilled memory registers. Logic thereafter returns to 590 and continues the monitor operation with the newly established timing format parameters fully synchronized to the incoming video signal.

The above described arrangement is merely illustrative of the principles of the present invention. Numerous modifications and adaptations thereof will be readily apparent to those skilled in the art without departing from the spirit and scope of the present invention.

What is claimed is:

1. In combination in a microprocessor controlled monitor, comprising:
   a. input means for receiving of a video signal having a particular timing format including horizontal and vertical timing signals for control of a raster scan based output,
   b. digital random access memory means for receiving and storing a plurality of designated and distinct timing format parameters, including an addressable timing signature, at discrete memory locations,
   c. said microprocessor means for calculating said timing signature based on said timing signals for said received video signal;
   d. said microprocessor means for comparing the signature of the received video signal with the signatures stored in said discrete memory locations,
   e. deflection control means including a horizontal DAC and a vertical DAC for receiving timing format parameters from said digital random access memory means and driving horizontal and vertical deflection yokes in response thereto, and
   f. said microprocessor means in communication with said deflection control means and random access memory means capable of operating in at least two separate modes, including an operation mode characterized by comparing and loading previously stored timing format parameters for the control of said DACs for driving said deflection yokes, and a calibration mode for quantifying specific timing format parameters associated with a received video signal having a signature that does not match any stored signature values in said memory and storage of the quantified specific timing format.

2. The microprocessor controlled monitor of claim 1, wherein said timing signature is based on the horizontal and vertical scanning frequency of the received video signal.

3. The monitor of claim 1, further comprising a video control means including a video DAC for controlling the video amplifier gain.

4. The microprocessor controlled monitor of claim 1, wherein said data processor provides, in said calibration mode, selected coarse alignment values to the DACs including horizontal hold, linearity, and B+voltage, sufficient to provide a stable image on a display screen, and further, user adjustable control means for adjusting plural dimensions of said stable image on said display screen.

5. The microprocessor controlled monitor of claim 4, wherein said data processor further provides for memory storage means for storing timing format parameters associated with a stable, properly sized and positioned image resulting from said calibration mode.

6. In a microprocessor system for controlling a raster scan process on a display monitor, comprising: video signal receiving means for reception of a composite video signal having image information and raster scan controlling sync information; microprocessor means for determining a sync signal signature from said received video signal and comparing said signature with a plurality of stored sync signal signatures; timing format parameter retrieval means for retrieving timing format parameters from memory means corresponding to a sync signal signature that matches said sync signal signature of said received video signal; raster scan control means for controlling said raster scan process by applying said matching timing format parameters to horizontal and vertical deflection circuits; and calibration means in communication with said microprocessor means for adjusting selected timing format parameters that are associated with a sync signal signature that fails to match any stored sync signal signatures, wherein said calibration means permits selected adjustment of horizontal size/width, horizontal position, vertical size/height, and vertical position associated with said raster scan process.

7. The system of claim 6, wherein said vertical and horizontal deflection circuits are modulated by discrete DACs and controlled by said matching timing format parameters.

8. The system of claim 6, wherein said calibration means further comprises the adjustment of pincushion correction, trapezoid correction, and horizontal linearity.

9. A microprocessor controlled process for synchronizing a display monitor to an incoming video signal having a range of possible horizontal scanning frequencies between about 15 KHz to about 75 KHz, comprising the steps of:
   a. receiving said incoming video signal;
   b. determining a timing signature associated with said incoming video signal, wherein said signature is a compilation of horizontal scan rate and vertical frame rate data;
   c. comparing said determined timing signature with a plurality of stored timing signatures which designate address locations, for storing discrete timing format parameters;
   d. retrieving timing format parameters associated with a stored timing signature that matches said determined timing signature;
   e. applying said selected timing format parameters to control a raster scan projection of said incoming video signal; and
   f. providing the capability to (i) calibrate said display monitor by adjusting selected timing format parameters, including horizontal position and width and vertical position and height, and (ii) thereafter storing the adjusted selected timing format parameters after calibration.

10. The process of claim 9 wherein said calibration step (f) includes accessing default parameters to provide a stable image on said display monitor for calibration.

11. The process of claim 9, wherein said raster scan projection is controlled by a horizontal DAC and vertical DAC that provide the resistive inputs to a horizontal deflection circuit and vertical deflection circuit, respectively.

* * * * *